United States Patent [19]

Harms

[11] Patent Number: 5,732,331
[45] Date of Patent: Mar. 24, 1998

[54] PORTABLE RADIO HAVING A DETACHABLE FLIP PORTION

[75] Inventor: Steven John Harms, Raleigh, N.C.

[73] Assignee: Ericsson Inc., Research Triangle Park, N.C.

[21] Appl. No.: 371,647

[22] Filed: Jan. 12, 1995

[51] Int. Cl.$^6$ ............................................. H04B 1/38
[52] U.S. Cl. .................. 455/90; 455/128; 455/351; 379/433
[58] Field of Search ........................ 455/89, 90, 128, 455/347, 348, 349, 351; 379/58, 59, 433, 434, 428; 200/61.7, 61.71, 61.62, 560, 563, 252; 16/260, 268, 262, 267; 439/31, 341, 928; 361/814, 683

[56] References Cited

U.S. PATENT DOCUMENTS

| | | | |
|---|---|---|---|
| 2,732,581 | 1/1956 | Heck | 16/267 |
| 4,845,772 | 7/1989 | Metroka et al. | 379/433 |
| 4,850,882 | 7/1989 | Yu | 439/31 |
| 4,863,387 | 9/1989 | Snaper et al. | 439/31 |
| 5,014,346 | 5/1991 | Phillips et al. | 455/89 |
| 5,027,394 | 6/1991 | Ono et al. | 379/434 |
| 5,111,503 | 5/1992 | Takagi | 379/433 |
| 5,117,073 | 5/1992 | Mischenko | 200/61.7 |
| 5,237,488 | 8/1993 | Moser | 361/729 |
| 5,259,019 | 11/1993 | Stilley | 379/428 |
| 5,267,123 | 11/1993 | Boothroyd et al. | 361/680 |
| 5,278,993 | 1/1994 | Reiff et al. | 455/90 |
| 5,293,300 | 3/1994 | Leung | 361/683 |
| 5,335,273 | 8/1994 | Takagi et al. | 379/433 |
| 5,361,456 | 11/1994 | Newby, Sr. | 16/260 |
| 5,507,013 | 4/1996 | Weadon et al. | 455/90 |

FOREIGN PATENT DOCUMENTS

| | | | |
|---|---|---|---|
| 0445808 | 3/1991 | European Pat. Off. | H04B 1/38 |
| 4134650 | 10/1992 | Germany | H04B 1/38 |

*Primary Examiner*—Nguyen T. Vo
*Attorney, Agent, or Firm*—David G. Matthews

[57] ABSTRACT

A portable radio includes a main housing having a first electrical circuit and a flip portion having a second electrical circuit. The flip portion is rotatively mounted with a hinge to the main housing for positioning the flip portion between a close position and an open position. The hinge includes a slot connected to the main housing and a rod connected to the flip portion. The slot includes a rod securing position where the rod is secured within the slot and a rod non-securing position where the rod is attachable and detachable from the slot to allow the flip portion to be detached from and reattached to the main housing. The radio further includes an electrical coupler mechanism that couples the first electrical circuit in the main housing with the second electrical circuit in the flip portion. The electrical coupler mechanism includes contacts that are freely separated from one another such that the electrical coupling mechanism is not damaged during the detachment and reattachment of the flip portion.

11 Claims, 6 Drawing Sheets

PORTABLE RADIO HAVING A DETACHABLE FLIP PORTION

FIELD OF THE INVENTION

The present invention is related generally to a portable radio having a flip portion, and more particularly to a portable radio having a flip portion rotatably and electrically connected to a main housing.

BACKGROUND OF THE INVENTION

Portable radios are designed to be compact so that users can conveniently carry the portable radios. In order to help achieve compactness, many conventional designs of portable radios have flip portions rotatably connected to a main housing by a hinge. The flip portion of a portable radio can be rotated between a compact, close position where the flip portion is typically adjacent to the main housing and an operational, open position where the flip portion is rotated away from the main housing.

Many flip portions contain electrical circuits that must be connected with electrical circuits located in the main housing. For example, conventional portable radios often locate the input microphone and/or antenna of the portable radio in the flip portion. Accordingly, an electrical connection must be made between the flip portion and the main housing. In the portion is rotated, the flexible wires maintain a fixed electrical connection between the flip portion and the main housing.

Rotatably and electrically connecting a flip portion to a main housing makes the portable phone susceptible to damage. The portable radio is susceptible to damage because the support that can be provided for an open flip portion is limited. Due to the cantilevered position of an open flip portion, the flip portion often is unable to withstand forces that may be applied during use of the portable radio. For instance, the flip portion of a portable radio may be broken or damaged when the portable radio is dropped or when a user presses with too much force against the open flip portion. A portable radio having a more durable flip portion is needed.

SUMMARY OF THE INVENTION

The present invention provides a portable radio having a flip portion that is rotatably and electronically connected to a main housing of the portable radio. The flip portion tends to detach from the main housing undamaged when an excessive force is applied to the flip portion of the portable radio and is easily reattached to the main housing. The detachable flip portion is thus more durable and less likely to be damaged during use.

In the preferred embodiment of the present invention, the portable radio includes a main housing having a first electrical circuit and a flip portion having a second electrical circuit. The second electrical circuit located in the flip portion includes a microphone and the first electrical circuit located in the main housing includes a speaker for outputting sound in response to signals generated by the microphone. The flip portion and main housing are mechanically and electrically coupled by an improved hinge and electrical connector that operate in conjunction with one another.

The hinge detachably connects the flip portion to the main housing so as to permit the attached flip portion to be rotatively positioned between open and close positions. The hinge includes a resilient slot fixed to the main housing and a rod fixed to the flip portion. The rod is securable within the slot to rotatably attach the flip portion to the main housing. The slot includes a slot opening which is biased in a securing position. When in the securing position the slot opening is sized to secure the rod within the slot and prevent the rod from freely passing through the slot opening. When a sufficient force is applied at the slot opening by the rod, the slot moves to a non-securing position where the slot opening is sized to allow the rod to pass therethrough. The flip portion is both detachable from the main housing and reattachable to the main housing by forcing the rod through the slot opening.

An electrical coupler mechanism works in conjunction with the hinge to electrically couple the attached flip portion and main housing, while allowing the flip portion and the main housing to be detached and reattached. The electrical coupler mechanism includes a first electrical connector connected with the first electrical circuit in the main housing and a second electrical connector connected to the second electrical circuit in the flip portion. The first electrical connector includes a spring-loaded first contact extending into the slot and the second electrical connector includes an elongated, second contact which forms an elongated strip on the surface of the rod. When the flip portion and main housing are attached, the first and second electrical contacts slidably mate as the flip portion rotates from the close position to the open position. The contacts are freely separated from one another and the electrical coupler mechanism is not damaged during the detachment and reattachment of the flip portion.

Accordingly, it is an object of the present invention to provide a portable radio having a durable flip portion.

Another object of the present invention is to provide a portable radio having a detachable flip portion.

Another object of the present invention is to provide a portable radio having a flip portion that tends to detach from the main housing when excessive force is applied to the flip portion.

Another object of the present invention is to provide a flip portion that can be easily reattached to the main housing.

Another object of the present invention is to provide an improved electrical coupler mechanism that is not damaged during the detachment and reattachment of the flip portion.

These and other objects of the present invention will become apparent in view of the drawings and the following discussion.

DETAILED DESCRIPTION OF THE PREFERRED EMBODIMENTS

Figure 1:
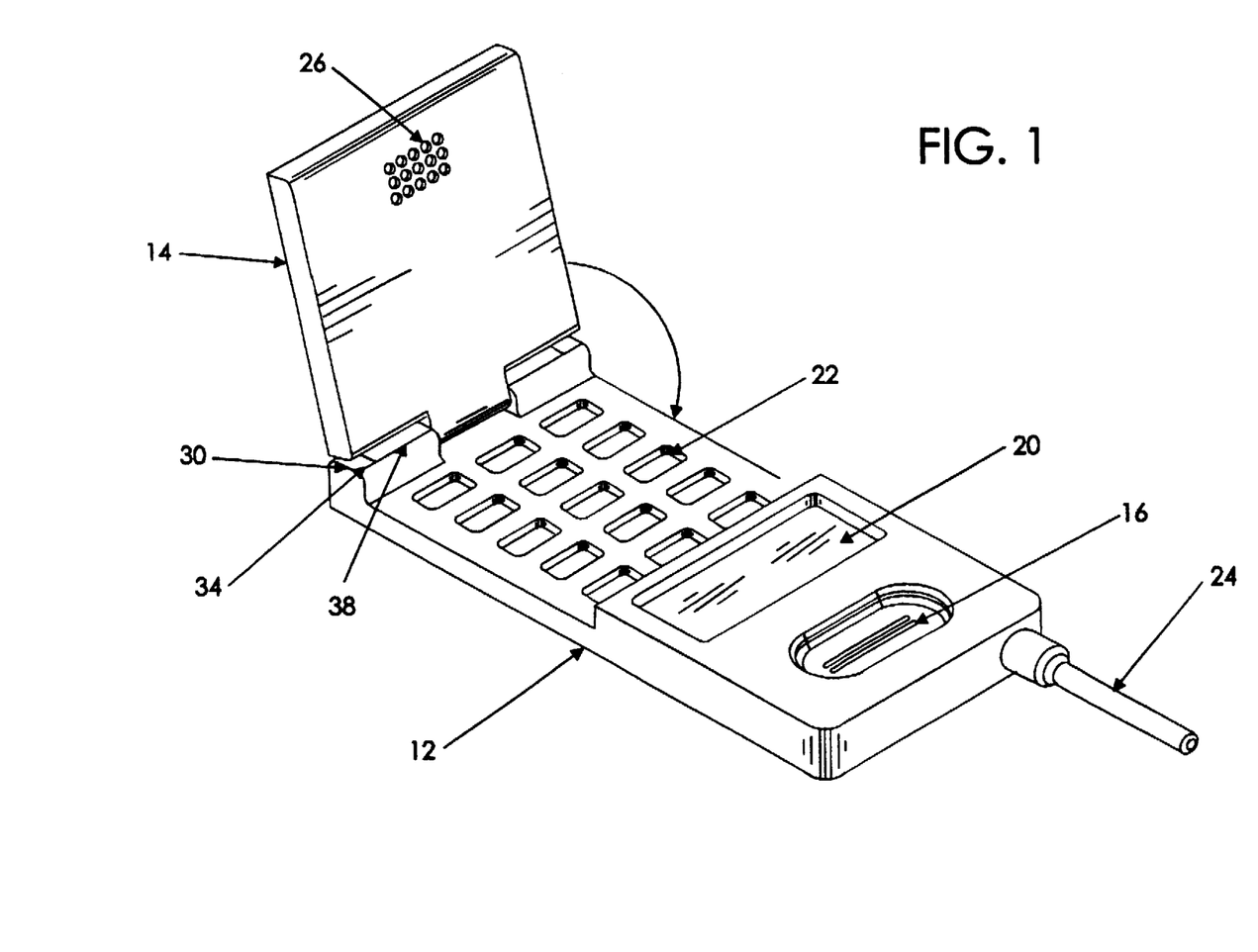
FIG. 1 is a perspective view of the portable radio of the preferred embodiment with the flip portion attached to the main housing and in the open position.

Referring now to FIG. 1, a portable radio 10 in accordance with the present invention is shown. The portable radio 10 generally includes a main housing 12 and a flip portion 14. The main housing 12 has a speaker 16, display 20, keypad 22, and antenna 24, while the flip portion 14 contains a microphone 26. The flip portion 14 is rotatively connected to the main housing 12 by a hinge 30 and is electrically coupled to the main housing 12 by an electrical coupler mechanism 32 (shown in detail in FIGS. 5–6) passing through the hinge 30. The present invention is principally directed to the manner in which the flip portion 14 and main housing 12 are rotatively and electrically connected by hinge 30 and electrical coupler mechanism 32.

Figure 2:
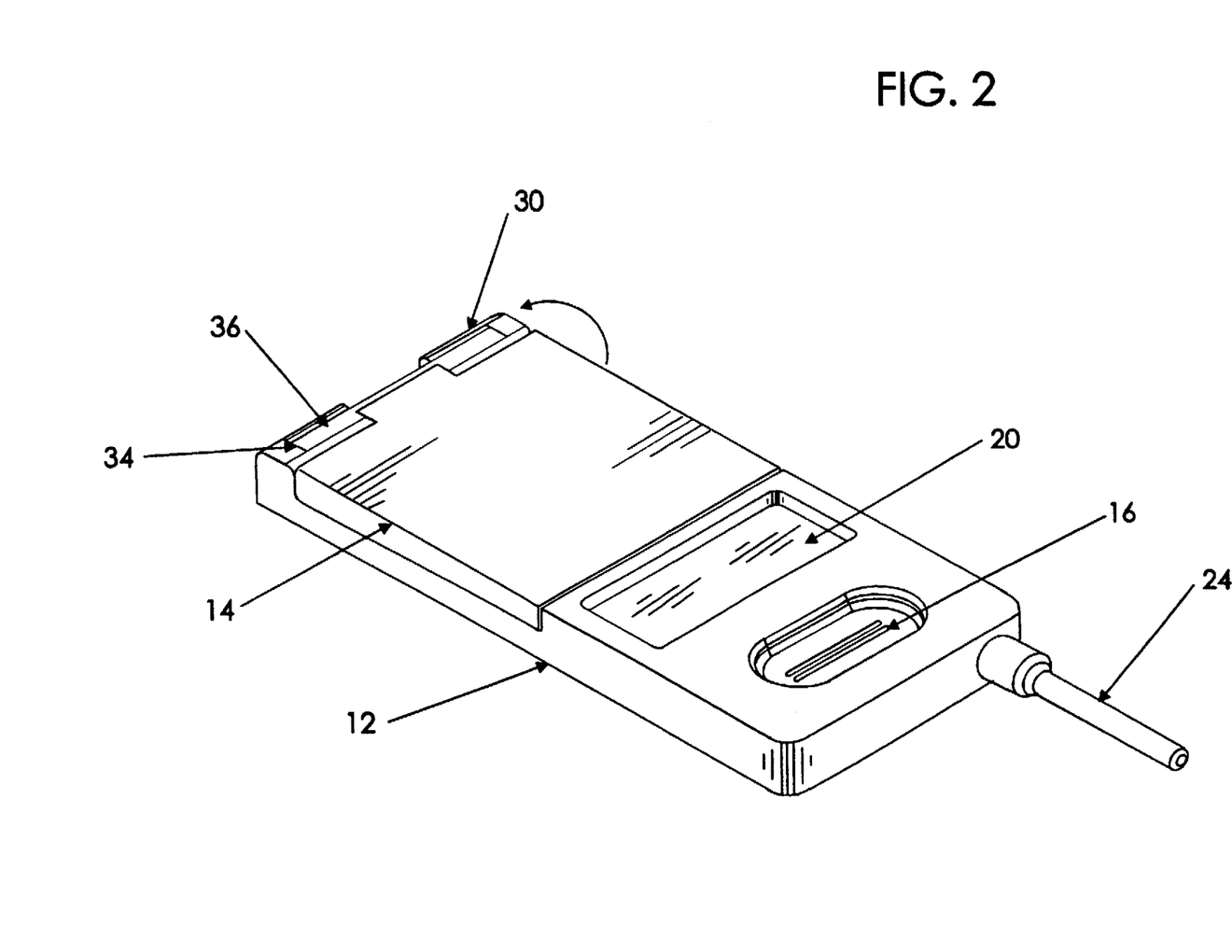
FIG. 2 is a perspective view of the portable radio of the preferred embodiment with the flip portion attached to the main housing and in the close position.

Hinge 30 generally includes a slot 34 integrally attached to the main housing 12 and a rod 36 integrally attached to flip portion 14. The rod 36 is securable within slot 34 to attach the flip portion 14 to the main housing 12. When the rod 36 is secured within slot 34, the flip portion 14 can be rotated between an open position where the flip portion 14 is rotated away from the main housing 12 and a close position where the flip portion 14 is rotated adjacent to the main housing 12. The open position of the flip portion 14 is shown in FIG. 1 and the close position is shown in FIG. 2.

Figure 3:
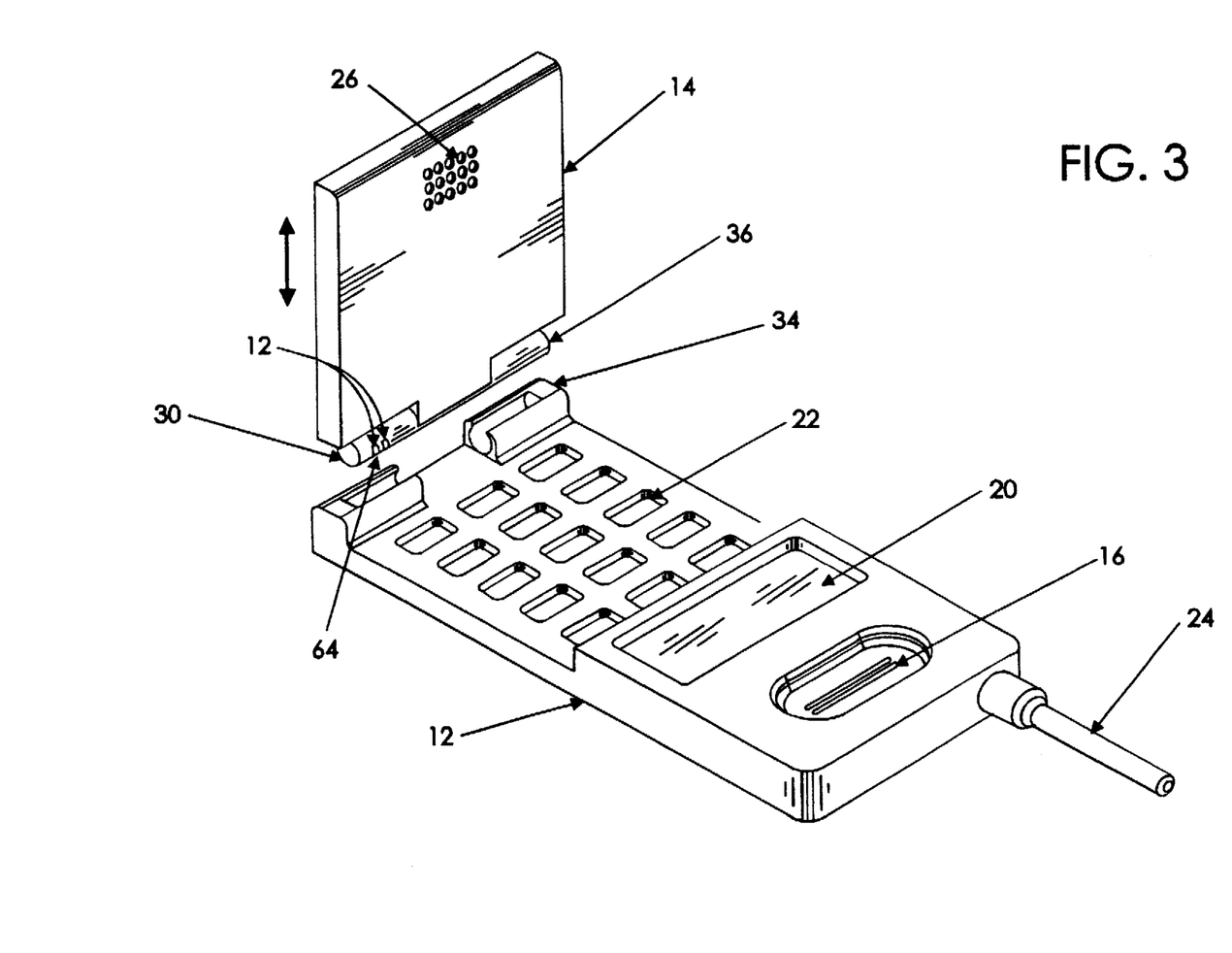
FIG. 3 is a perspective view of the portable radio of the preferred embodiment with the flip portion detached from the main housing.
Figure 4:
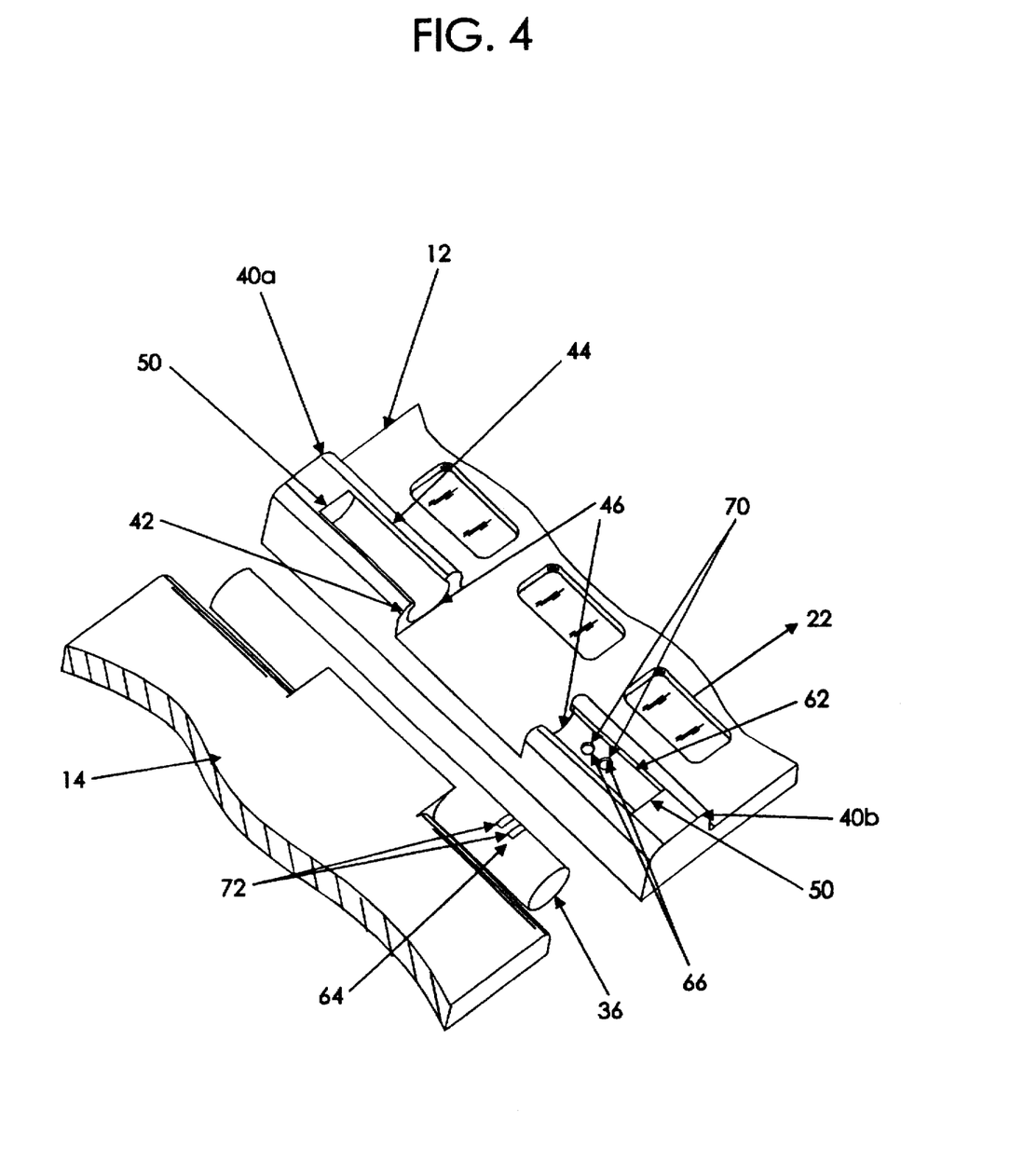
FIG. 4 is a perspective view of the hinge and electrical coupler mechanism with the flip portion detached from the main housing.

As best shown in FIGS. 3 and 4, the rod 36 is cylindrical and the slot 34 is formed by spaced slot segments 40a and 40b. The slot segments 40a and 40b are integrally attached to main housing 12. Each slot segment 40a and 40b has a wall structure 42 that defines a slot opening 44 leading into a cylindrical slot cavity 46. The slot 34 extends between end walls 50 of slot segments 40a and 40b, and has a length corresponding with the length of the rod 36.

In the preferred embodiment, the rod 36 is made from a hard plastic and the wall structure 42 of slot 34 is made from a resilient plastic or other resilient material. The wall structure 42 is resilient so that the slot 36 is movable between a rod securing position shown in FIG. 5 and a rod non-securing position shown in FIG. 6. When in the rod securing position, the slot opening 44 is sized to prevent rod 36 from passing therethrough. When in the rod non-securing position, the slot opening 44 is sized to allow the rod 36 to pass therethrough. The resilient wall structure 42 is biased in the rod securing position so as to normally secure rod 36 within slot 34.

The wall structure 42 is forcible from the rod securing position to the rod non-securing position by pressing the rod 36 against the wall structure 42 at slot opening 44. The rod 36 must be pressed with sufficient force to move the wall structure 42 outwardly so as to enlarge the slot opening 44. The slot opening 44 is enlarged to a point where the rod 36 passes through the slot opening 44 and either into or out of the slot cavity 46. The slot 34 moves back to its biased rod securing position once the rod 36 has passed through the slot opening 44 and the force against wall structure 42 has been removed.

Figure 5:
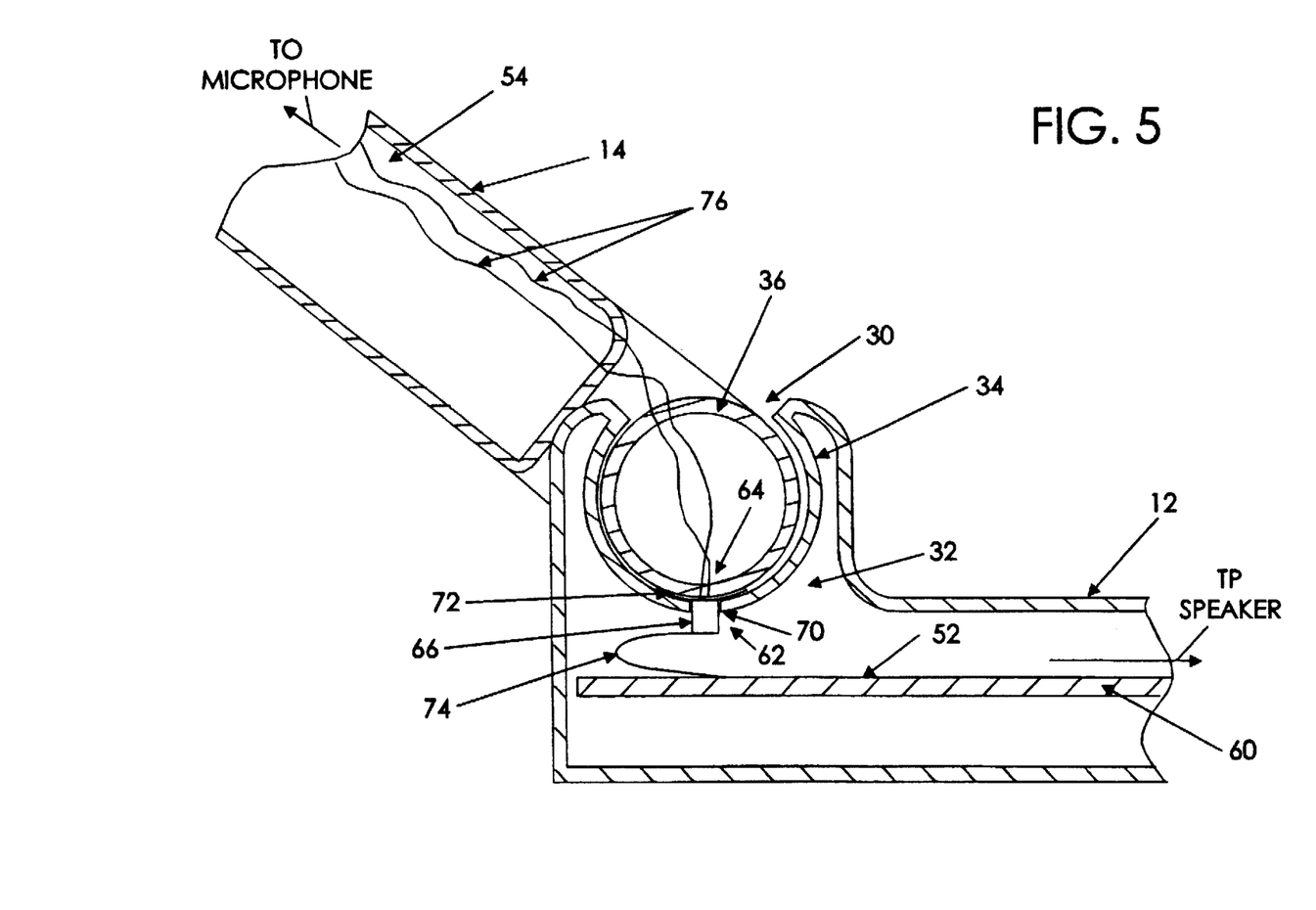
FIG. 5 is a side cross-sectional view of the hinge and electrical coupler mechanism with the flip portion attached to the main housing.
Figure 6:
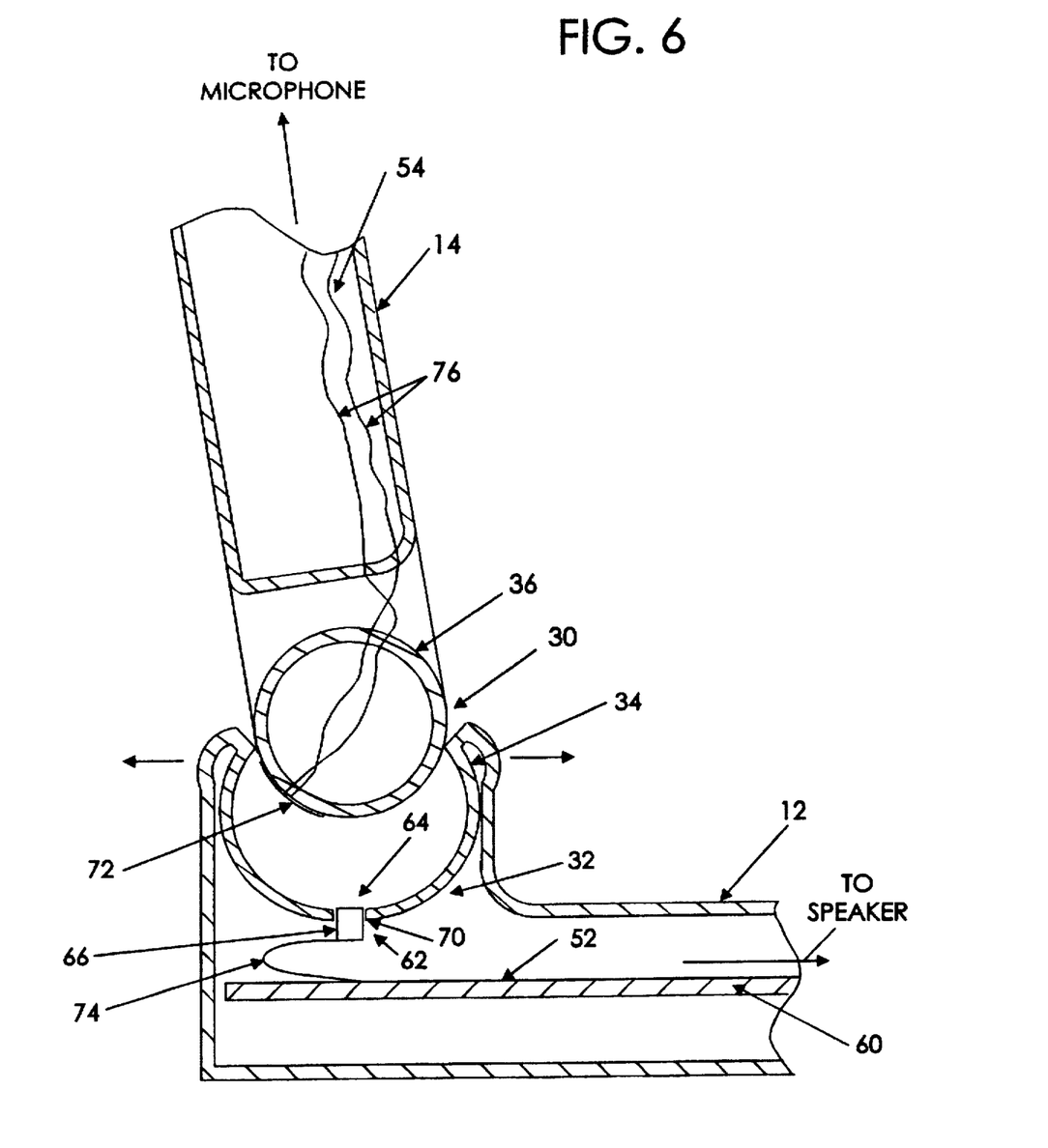
FIG. 6 is a side cross-sectional view of the hinge and electrical coupler mechanism with the flip portion being detached from or reattached to the main housing.

As shown in FIGS. 4–6, electrical coupler mechanism 32 electrically connects a first electrical circuit 52 in the main housing 12 to a second electrical circuit 54 in the flip portion 14, while allowing the flip portion 14 to be detached and reattached to the main housing 12 without damage. In the preferred embodiment, the second electrical circuit 54 contained in the flip portion 14 includes the microphone 26, and the first electrical circuit 52 contained in the main housing 12 includes the speaker 16. The second electrical circuit contained in the flip portion 14 may, in the alternative, contain an antenna or other electrical component that may be selected to be located in the flip portion 14.

The electrical coupler mechanism 32 includes a first electrical connector 62 connected to the speaker 16 in the main housing 12 and a second electrical connector 64 connected to the microphone in the flip portion 14. As shown in FIG. 4, the first electrical connector 62 includes a pair of metal conductive contacts 66 that extend through a pair of contact openings 70 in wall structure 42 and into the slot cavity 46. The second electrical connector 64 includes a pair of metal conductive contacts 72 that form elongated strips extending along the outer surface of rod 36. Each contact 66 extending into the slot cavity 46 mates with one of the contacts 72 on rod 36. The contacts 66 and 72 are mated with one another and connect the first and second electrical circuits 52 and 54 when the flip portion 14 is attached to the main housing 12 and in the open position.

FIGS. 5 and 6 illustrate the electrical coupler mechanism 32 in more detail. Each conductive contact 66 is attached to the first electrical circuit in the main housing 12 by a spring 74. Each spring 74 is connected to the first electrical circuit 52 by soldering one end of the spring 74 to a circuit board 60 which is connected to the speaker 16. The circuit board 60 provides for signal processing of signals inputted from the microphone 26 and the speaker 16 outputs sound in response to the processed signals. The other end of the spring 74 is attached to the metal contact 66 such that the connected metal contact 70 is biased in an extended position where the contact 66 extends through the contact opening 70 and into slot cavity 46. Each contact 72 formed on rod 36 forms an elongated metal strip selectively positioned on the outer surface of rod 36. Each elongated conductive contact 72 is connected with a wire 76 that extends through the rod 36 and flip portion 14 to the microphone 26.

As shown in FIG. 5, conductive contacts 72 slidably mate with conductive contacts 66 to electrically connect the flip portion 14 to the main housing 12 when the flip portion 14 is attached to the main housing 12 and in an open position. Due to the spring loading of each contact 66, mated conductive contacts 66 and 72 press against one another to ensure a constant pressure between the mated conductive contacts 66 and 72, resulting in an effective electrical connection. The mated conductive contacts 66 and 72 form a sliding contact that provides a wiping action as the rod 36 rotates within the slot cavity 46. This wiping action helps prevent the contacts 66 and 72 from becoming corroded.

In the preferred embodiment, the elongated conductive contacts 72 are extended around only a portion of the radius of the rod 36. The elongated conductive contacts 72 are positioned so that the mated conductive contacts 66 and 72 slidably disengage when the flip portion is rotated from the open position to the close position. Thus, the flip portion 14 is only electrically connected to the main housing when the flip portion 14 is in the open position. In alternative embodiments, the elongated contacts 72 could be further extended around the radius of the rod 36 so that the flip portion 14 remains electrically connected with main housing 12 while in either an open position or a close position.

In operation, the portable radio 10 of the present invention operates as follows. A user of portable radio 10 rotates the attached flip portion 14 from a close position to an operational, open position. As the flip portion 14 is rotated to the open position, the conductive contacts 66 of the first electrical connector 62 is slidably engaged with the conductive contacts 72 of the second electrical connector 64. The mated conductive contacts 66 and 72 result in the first electrical circuit 52 of the main housing 12 being electrically connected with the second electrical circuit 54 of the flip portion 14. Accordingly, in the preferred embodiment, the microphone 26 located in the flip portion 14 is electrically connected to the speaker 16 located in the main housing 12.

If a sufficient force is applied to the flip portion 14 during use, the hinge 30 will separate and the flip portion 14 will detach from the main housing 12. In particular, slot 34 moves from its rod securing position to its rod non-securing position when rod 36 exerts a sufficient force against the wall structure 42 of hinge 30 at slot opening 44. As shown in FIG. 6, the rod 36 is able to pass through the slot opening 44 when the slot 34 is forcibly moved to the rod non-securing position.

Wall structure 42 of slot 34 is designed to move from the rod securing position to the rod non-securing position when an excessive force that could potentially damage the flip portion 14 is applied. This results in the flip portion 14 being detached from the main housing 12 instead of being damaged when an excessive force is applied to flip portion 14. An excessive force may be applied to the flip portion 14 if the portable radio 10 is inadvertently dropped by a user or if the user applies an excessive force to the flip portion 14 while it is in the open position. Once the flip portion 14 has become detached, the resiliency of wall structure 42 causes the wall structure 42 to move inwardly and back to the biased rod securing position.

The flip portion 14 can be reattached to the main housing 12 by pressing the rod 36 against the wall structure 42 at the slot opening 44 with sufficient force to move the wall structure outwardly so as to enlarge the slot opening 44 and move the slot 30 from the rod securing position to the rod non-securing position. Once the slot opening 44 has been enlarged, the rod 36 can be moved through the slot opening 44 and into the slot cavity 46 positioning the rod 36 in slot cavity 46 releases the force against the wall structure 42 and the wall structure 42 moves inwardly, reducing the size of slot opening 44 to place the slot 30 in the rod securing position. The flip portion 14 is thus easily reattached to the main housing 12.

It will be appreciated by those of ordinary skill in the art that the present invention can be embodied in other specific forms without departing from the spirit or essential character thereof. The presently disclosed embodiments are therefore considered in all respects to be illustrative and not restrictive.

What is claimed is:

1. A portable radio, comprising
   a. a main housing;
   b. a flip portion;
   c. a hinge for rotatably connecting the flip portion to the main housing, the hinge including:
      i) a slot having a wall structure defining a slot opening leading into a slot cavity, the wall structure including a contact opening,
      ii) a rod disposable in the slot cavity,
      iii) wherein the slot is connected to either the main housing or the flip portion and the rod is connected to either the main housing or the flip portion so as to rotatably connect the flip portion to the main housing when the rod is disposed within the slot cavity, and
      iv) wherein the wall structure of the slot is resilient and is biased in a rod securing position where the slot opening defined by the wall structure is sized to prevent the rod disposed in the slot cavity from freely passing therethrough so as to rotatably attach the flip portion to the main housing, the wall structure forcibly moveable from the rod securing position to a rod non-securing position where the slot opening defined by the wall structure is sized to allow the rod disposed in the slot cavity to pass therethrough so that the flip portion is detachable from the main housing and reattachable to the main housing;
   d. a first electrical circuit disposed in the main housing;
   e. a second electrical circuit disposed in the flip portion; and
   f. an electrical coupler mechanism for making an electrical connection between the first and second electrical circuits, the electrical coupler mechanism including:
      i) a first electrical connector connected to the first electrical circuit in the main housing and having a first conductive contact,
      ii) a second electrical connector connected with the second electrical circuit in the flip portion and having a second conductive contact,
      iii) the first and second conductive contacts positionable in an electrically coupled position when the flip portion is attached to the main housing such that the first and second electrical circuits are electrically coupled,
      iv) wherein at least one of the conductive contacts is biased towards the other conductive contact so as to provide secure electrical coupling between the conductive contacts and wherein the first and second conductive contacts are slidably mateable so as to provide a wiping action between the conductive contacts as the rod rotates within the slot,
      v) wherein the first conductive contact is spring-loaded and biased to extend through the contact opening and into the slot cavity so as to engage the second conductive contact when the first and second conductive contacts, are electrically coupled, and
      vi) wherein the first and second electrical connectors are moveable from the electrically coupled position to an electrically uncoupled position by detaching the flip portion from the main housing and are moveable from the electrically uncoupled position to the electrically coupled position by attaching the flip portion to the main housing.

2. The radio of claim 1, wherein the first circuit disposed in the main housing includes a speaker and the second circuit disposed in the flip portion includes a microphone.

3. The radio of claim 1, wherein the flip portion is rotatable from an open position where the flip portion extends outwardly from the main housing to a close position where the flip portion is disposed adjacent the main housing, and wherein the first and second electrical connectors move from the electrically coupled position to the electrically uncoupled position when the flip portion is rotated from the open position to the close position.

4. The radio of claim 3, wherein one of the conductive contacts is an elongated contact having a length selected to move the first and second electrical connectors from the electrically coupled position to the electrically uncoupled position when the flip portion is rotated from the open position to the close position.

5. The radio of claim 1, wherein one of the conductive contacts is an elongated contact extending at least partially around the rod.

6. The radio of claim 5, wherein one of the conductive contacts is biased to extend through a contact opening in the wall structure of the slot and engage the elongated conductive contact.

7. A portable radio, comprising:

a. a main housing having a first electrical circuit;

b. a flip portion having a second electrical circuit;

c. a hinge for rotatably connecting the flip portion to the main housing so as to permit positioning of the flip portion between a closed position and an open position, the flip portion moveable between an attached state where the flip portion is rotatably connected to the main housing and a detached state where the flip portion is detached from the main housing, and the hinge including:

i) a slot having a resilient wall structure defining a slot opening leading into a slot cavity and having a contact opening, the slot biased in a rod securing position where the slot opening is sized for maintaining the flip portion in the attached state and being resiliently positionable from the rod securing position to a rod non-securing position where the slot opening is sized for allowing the flip portion to be positioned between the attached and detached states, ii) a rod positionable in the slot cavity and securable in the slot when the slot is biased in the rod securing position, iii) wherein the slot is connected to either the flip portion or the main housing and the rod is connected to the either the flip portion or the main housing so that the flip portion is rotatably connected to the main housing when the rod is secured in the slot, and iv) wherein the flip portion is positionable between the attached state and the detached state by pressing the rod through the slot opening so as to move the slot from the rod securing position to the rod non-securing position;

d. an electrical coupler mechanism for making an electrical connection between the first and second electrical circuits, the electrical coupler mechanism including:

i) a first electrical connector connected to the first electrical circuit in the main housing and having a first conductive contact, ii) a second electrical connector connected with the second electrical circuit in the flip portion and having a second conductive contact, iii) wherein the first and second conductive contacts are slidably mateable when the flip portion is attached to the main housing so as to position the first and second electrical connectors in an electrically coupled position such that the first and second electrical circuits are electrically coupled, iv) wherein the first conductive contact is spring-loaded and biased to extend through the contact opening and into the slot cavity so as to engage the second conductive contact when so as to provide a wiping action between the conductive contacts as the rod rotates within the slot; and v) wherein the first and second electrical connectors are moveable from the electrically coupled position to an electrically uncoupled position by detaching the flip portion from the main housing and are moveable from the electrically uncoupled position to the electrically coupled position by attaching the flip portion to the main housing.

8. The radio of claim 7, wherein the first electrical circuit disposed in the main housing includes a speaker and the second electrical circuit disposed in the flip portion includes a microphone.

9. The radio of claim 7, wherein the flip portion is rotatable from an open position where the flip portion extends outwardly from the main housing to a close position where the flip portion is disposed adjacent the main housing, and wherein the first and second electrical connectors move from the electrically coupled position to the electrically uncoupled position when the flip portion is rotated from the open position to the close position.

10. The radio of claim 7, wherein the second conductive contact is an elongated contact extending at least partially around the rod.

11. The radio of claim 10, wherein the length of the elongated conductive contact is selected so as to move the first and second electrical connectors from the electrically coupled position to the electrically uncoupled position when the flip portion is rotated from the open position to the close position.

* * * * *